United States Patent [19]

Siddiqui et al.

[11] Patent Number: 5,154,138
[45] Date of Patent: Oct. 13, 1992

[54] WATERING NIPPLE

[75] Inventors: Shahid A. Siddiqui, Leesburg; Timothy W. Momont, Wolcottville, both of Ind.

[73] Assignee: CTB, Inc., Milford, Ind.

[21] Appl. No.: 740,317

[22] Filed: Aug. 5, 1991

[51] Int. Cl.⁵ .......................... A01K 39/02; F16L 1/16
[52] U.S. Cl. .............................. 119/72.5; 251/339
[58] Field of Search ............... 119/72.5, 72; 151/125, 151/303, 339; 137/604, 614.19; 222/422

[56] References Cited

U.S. PATENT DOCUMENTS

| | | | |
|---|---|---|---|
| 1,746,727 | 2/1930 | Dunlap | 251/339 |
| 1,918,566 | 7/1933 | Sadleir | 119/72.5 |
| 2,281,051 | 4/1942 | Roger | 119/72.5 X |
| 2,457,159 | 12/1948 | Kofford | 119/72.5 |
| 2,486,729 | 11/1949 | Beckley | 119/72.5 |
| 2,510,252 | 6/1950 | Pine | 119/72.5 |
| 2,541,369 | 11/1947 | Kofford | 119/72.5 |
| 2,614,531 | 10/1952 | Futterer | 119/72.5 |
| 2,939,424 | 6/1960 | Frederiksen | 119/72.5 |
| 3,322,101 | 5/1967 | Eagles et al. | 119/72.5 |
| 3,418,977 | 12/1968 | Godshalk | 119/72.5 |
| 3,537,430 | 11/1970 | Peppler | 119/72.5 |
| 3,566,844 | 3/1971 | Occhiodori | 119/72.5 |
| 3,716,030 | 2/1973 | Godshalk et al. | 119/72.5 |
| 3,838,664 | 10/1974 | Atchley | 119/72.5 |
| 3,887,165 | 6/1975 | Thompson | 251/303 |
| 4,258,666 | 3/1981 | Edstrom | 119/72.5 |
| 4,402,343 | 9/1983 | Thompson et al. | 119/72.5 |
| 4,416,221 | 11/1983 | Novey | 119/72.5 |
| 4,516,533 | 5/1985 | Mallinson | 119/72 |
| 4,890,578 | 1/1990 | Rader | 119/72.5 |

FOREIGN PATENT DOCUMENTS 26012   1/1931   Australia ..................... 119/72.5

*Primary Examiner*—Gene Mancene
*Assistant Examiner*—Todd E. Manahan
*Attorney, Agent, or Firm*—Trexler, Bushnell, Giangiorgi & Blackstone, Ltd.

[57] ABSTRACT

The watering nipple, constructed according to the teachings of the present invention, comprises a body having a water delivering channel therein. The water delivering channel has an inlet and an outlet, and defines a path of water flow. A pin having a head and a stem is disposed within the water delivering channel, with the stem protruding beyond the outlet. The pin is capable of movement within the water delivering channel so as to open and close the outlet. An enlarged body, having an extension and a knob, is connected to the stem. The knob has a horizontal surface which confronts the valve body thereby increasing the surface area capable of retaining water. A pin and a movable element are included within the water delivering channel in some constructions. The pin is able to close the inlet under the influence of the movable element.

14 Claims, 2 Drawing Sheets

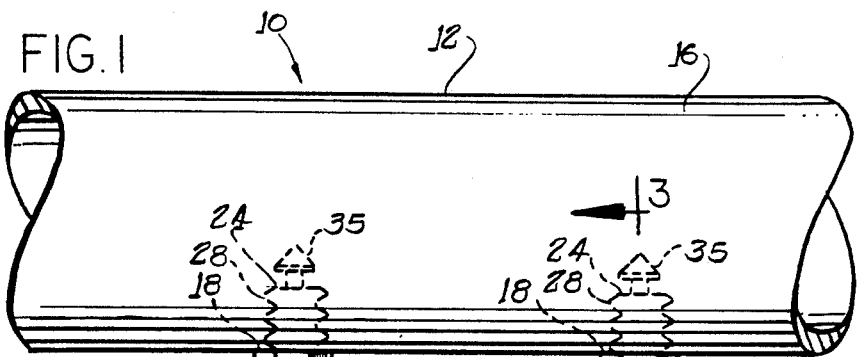
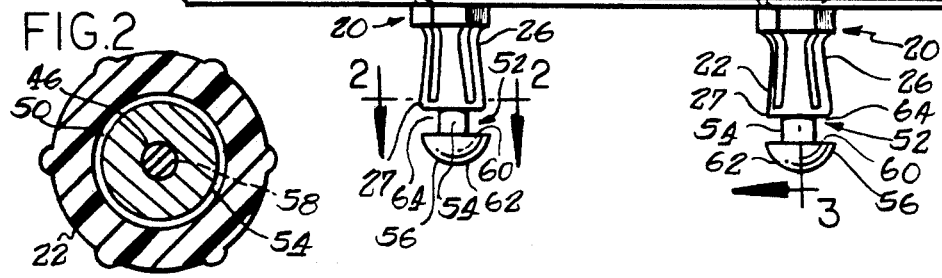
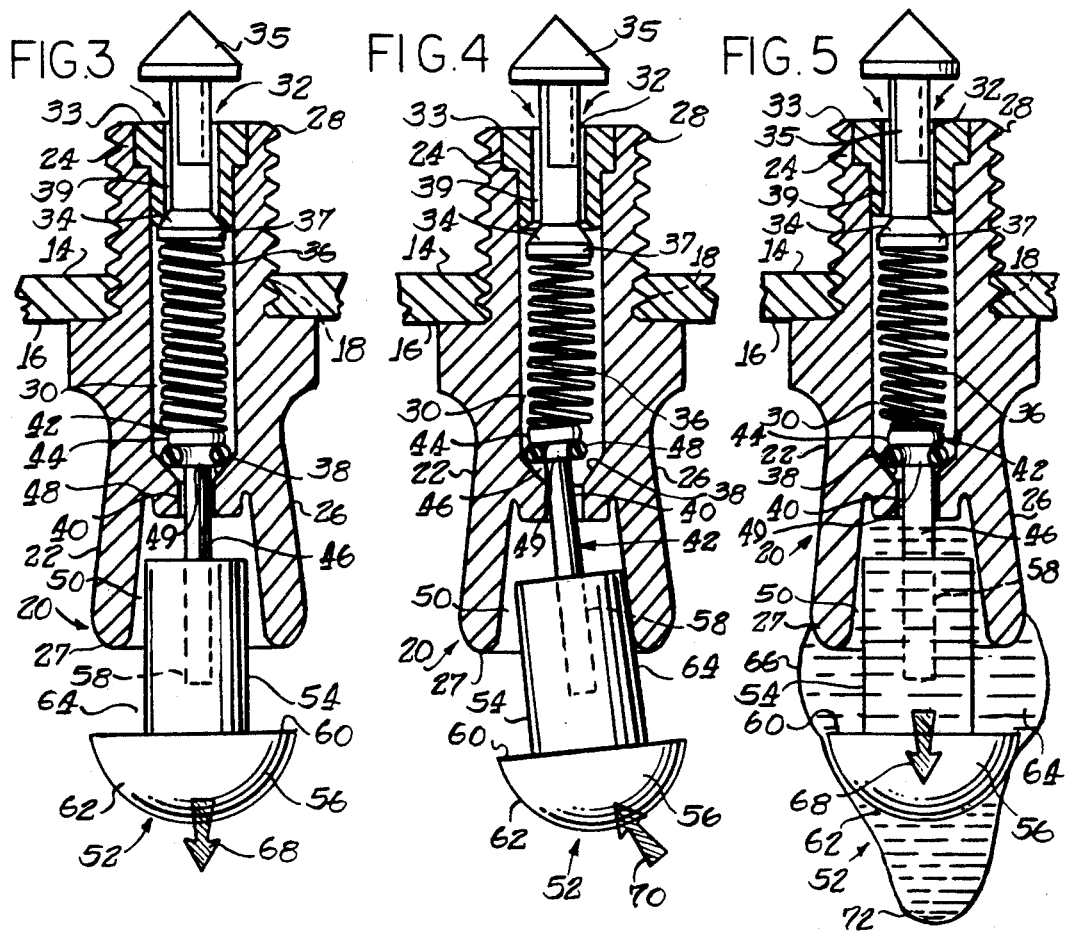

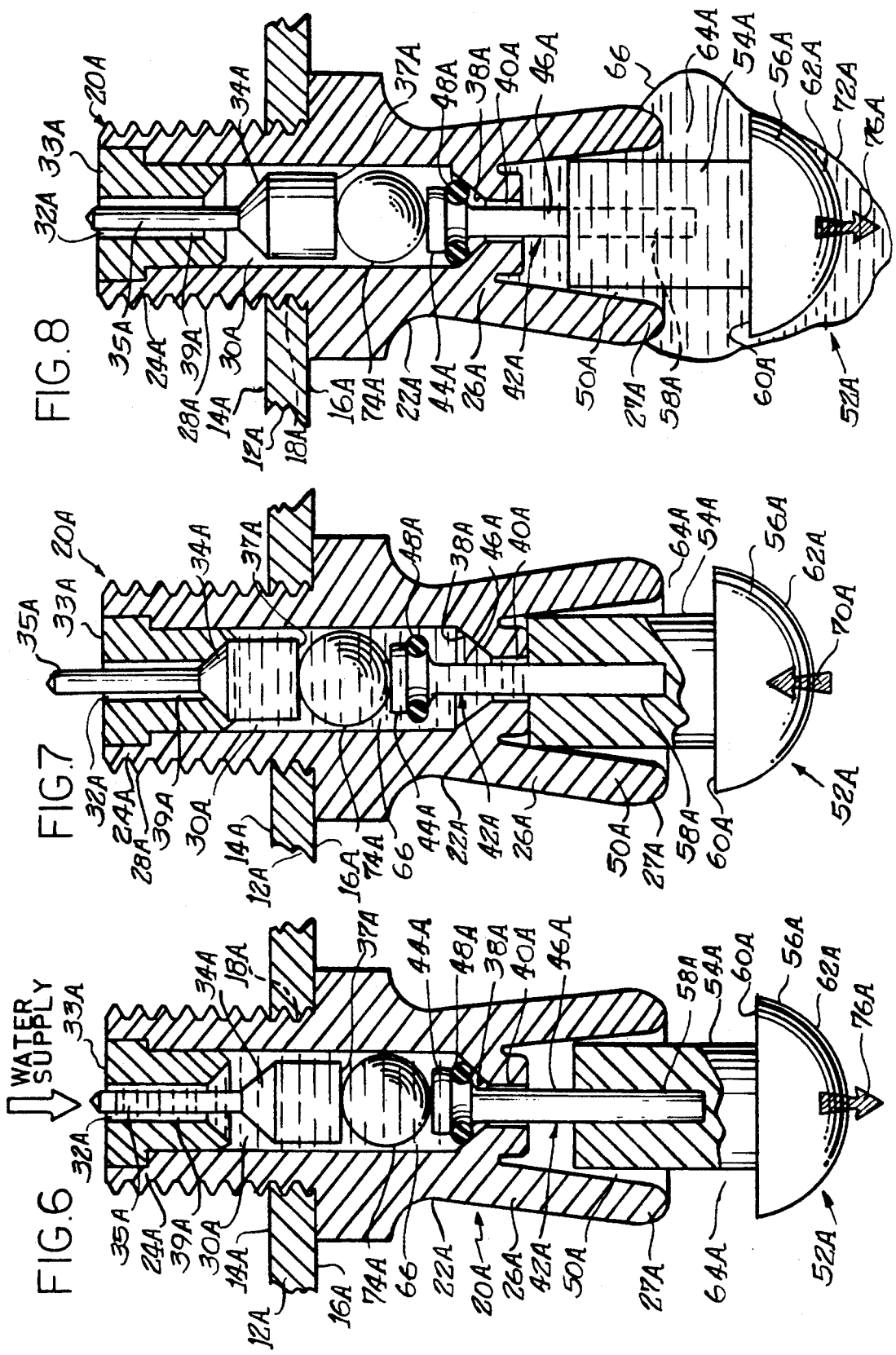

WATERING NIPPLE

BACKGROUND AND SUMMARY OF THE INVENTION

Generally, this invention relates to a unique construction of a watering nipple for use in supplying water to poultry, other fowl, or small animals. More specifically, the invention relates to a means for supplying poultry with easily accessible drinking water in a manner that will encourage the poultry to drink, and that will reduce waste of water, along with the attendant sanitary problems.

Watering nipples have been used widely for a number of years. The structure of watering nipples has been disclosed, for example, in the following patents:

| Kofford | 2,457,159 | 12/28/48 |
| Beckley | 2,486,729 | 11/01/49 |
| Kofford | 2,541,369 | 02/13/51 |
| Eagles. et al. | 3,322,101 | 05/30/67 |
| Godshalk | 3,418,977 | 12/31/68 |
| Godshalk. et al. | 3,716,030 | 02/13/73 |

The nipples of these patents disclose means for animals to water themselves. Specifically, those patents show structures that deliver water to animals when an animal actuates a pin in the nipple. However, in those structures, an enlargement at the end of the pin is located within a valve body, thereby significantly limiting the ability of the nipple to retain water for the animal.

The patent of Frederiksen, U.S. Pat. No. 2,939,424, is a good example of a nipple structure able to retain only a very small amount of water. Also, this structure is adapted to an animal licking the nipple to drink, which is not easily possible for some animals, especially birds. The patents of Futterer, U.S. Pat. No. 2,614,531, and Novey, U.S. Pat. No. 4,416,221, disclose nipple structures having a water passageway through the pin, thereby requiring an animal to grasp the pin in its mouth, and, simultaneously, to pull on the pin in order to drink. None of these structures are able to retain a relatively large amount of drinking water in a position at which the water is readily available to the animal for drinking. Furthermore, none of these structures presents an appearance to the animals which can encourage them to drink.

Therefore, it is desired to have a watering nipple having an increased surface area over the surface areas of nipples of the prior art so as to retain a larger volume of water, by the actions of natural surface tension and the adhesive properties of water, in the shape of the retaining piece, and in a position easily accessible to animals for drinking, thereby increasing water availability to the animals. In this manner, waste of water, and the accompanying sanitary problems would be reduced. Also, it is desired to have a watering nipple having a highly reflective enlarged body so that, when combined with the reflectivity of the water retained about the pin and the body, the nipple presents an image to the animal that will encourage it to drink.

OBJECTS AND SUMMARY OF THE INVENTION

A general object of the invention is to provide a watering nipple capable of retaining a volume of water greater than the nipples currently available, in a position from which an animal can drink.

Another object of the present invention is to provide a watering nipple having an enlarged body protruding beyond a lower end of a valve body.

A further object of the invention is to provide a watering nipple wherein the enlarged body has a horizontal surface confronting the lower end of the valve body so that water can be retained between the lower end and the horizontal surface, thereby presenting an image to animals that can encourage them to drink.

An additional object of the present invention is to provide a watering nipple having a highly reflective enlarged body.

Another object of the invention is to provide a watering nipple that has increased water availability to animals as compared with other watering nipples currently available.

A further object of the present invention is to provide a watering nipple constructed so as to have greater surface area capable of retaining water as compared to other watering nipples currently available.

An additional object of the invention is to provide a watering nipple capable of reducing waste of water, along with the attendant sanitary problems, as compared with watering nipples currently available.

Another object of the present invention is to provide a watering nipple having a reverse check valve pin actuable by a movable element whereby the flow of water into the nipple can be restricted.

A further object of the invention is to provide a watering nipple having a reverse check valve pin and a movable element which form a weight bearing upon a gasket sealing the water outlet.

The watering nipple, constructed according to the teachings of the present invention, comprises a body having a water delivering means therein. The water delivering means has an inlet and an outlet, and defines a path of water flow. A pin having a head and a stem is disposed within the water delivering means, with the stem protruding beyond the outlet. The pin is capable of movement within the water delivering means so as to open and close the outlet. An enlarged body, having an extension and a knob, is connected to the stem. The knob has a horizontal surface which confronts the valve body thereby increasing the surface (talk about inlet)-*area capable of retaining water.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a fragmentary elevational view of a water pipe having a plurality of watering nipples, constructed according to the teachings of the invention, for watering poultry, or other animals;

FIG. 2 is an enlarged sectional view, taken along line 2—2 of FIG. 1, of a watering nipple showing the relative thicknesses of the elements thereof;

FIG. 3 is an enlarged sectional view of a watering nipple, taken along line 3—3 of FIG. 1, connected to a water pipe, showing the disposition of the nipple when the outlet is closed;

FIG. 4 is a sectional view, similar to that of FIG. 3, showing the disposition of the nipple when a force is applied to the pin, causing the pin to pivot, thereby opening the outlet;

FIG. 5 is a sectional view, similar to that of FIG. 3, showing the disposition of the nipple while retaining water for an animal to drink;

FIG. 6 is an enlarged sectional view, similar to that of FIG. 3, of an alternative construction of the watering nipple, with water disposed within the bore;

FIG. 7 is an enlarged sectional view, similar to that of FIG. 3, of the watering nipple depicted in FIG. 6, when a force is applied to the pin; and FIG. 8 is an enlarged sectional view, similar to that of FIG. 3, of the watering nipple depicted in FIG. 6, showing the disposition of the watering nipple while retaining water for an animal to drink.

DETAILED DESCRIPTION OF A PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. It should be noted that while the invention is described with relation to its employment with poultry, the invention can be used with many different life forms.

Referring initially to FIG. 1, a section of a watering system 10 is shown. Due to the large number of fowl usually kept at a farm, for instance, the watering system 10 comprises a water pipe 12 which usually extends throughout a chicken house. A constant supply of fresh drinking water is maintained within the water pipe 12 at a certain pressure, as will be described herein.

The water pipe 12 has an interior surface 14 and an exterior surface 16, with apertures 18 extending through those surfaces 14 and 16. The apertures 18 are constructed so as to accept watering nipples 20. The watering nipples 20 are inserted into the apertures 18, as will be disclosed herein, to form a water tight fit. In this manner, water inside the water pipe 12 can move through the watering nipples 20, and be consumed by an animal. Also, water will not leak out of the water pipe 12, thereby minimizing water waste and related sanitary problems.

Referring to FIG. 3, the particular construction of the watering nipple 20 is disclosed. The watering nipple 20 generally comprises a body or valve body 22 having a first end 24 and a second end 26. A sleeve member 27 depends from the second end 26. Projections or threads 28 are disposed upon the first end 24, which is of sufficient diameter to allow the apertures 18 to accept the first end 24, with the projections 28 engaging the interior and exterior surfaces 14 and 16 of the water pipe 12, and the apertures 18, to form a water tight fit between the watering nipple 20 and the water pipe 12. The water tight fit can be insured by application of a material, such as a Teflon tape, and the like, to the projections 28 as the projections 28 are inserted into the apertures 18.

In the interior of the valve body 22, extending between the first end 24 and the second end 26, is water delivering means, or a bore 30. Proximate to the first end 24, the bore 30 forms a water inlet 32, which communicates with the interior of the water pipe 12, so that water from the water pipe 12 can enter the bore 30. Proximate to the second end 26, the diameter of the bore 30 decreases to form a projecting member or conical valve seat 38 and a water outlet 40, so that water within the bore 30 can exit the valve body 22 for drinking. A valve element or pin 42, shiftable between outlet closing and outlet opening positions, is disposed for cooperation with the seat 38. The valve element includes a head 44, a stem 46, and an O-ring or gasket 48. The water outlet 40 is of sufficient diameter to accept the stem 46 of the pin 42, but not sufficient to accept the head 44 or gasket 48. Opposite to the water outlet 40 and the first end 24, the diameter of the bore 30 increases to form a sleeve retention area 50 bounded by the sleeve member 27. The function of the sleeve retention area 50 will become more clear herein.

A spring 36 is disposed within the bore 30 with a lower end thereof in engagement with the head 44 of the valve element 42 for normally resiliently biasing the valve element 42 against the seat 38. An upper end of the spring abuts against a face or contacting portion 37 of a lower enlarged end or base 34 of a reverse check valve pin 35 which extends through the water inlet 32. A fitting 33 is fixed within the inlet end of the bore 30 for retaining the pin 35, and thus the spring 36 and the valve element 42 within the bore 30. A bore 39 through the fitting 33 provides a passageway around the pin 35 permitting flow of water when the watering nipple 20 is actuated, as described below.

The head 44 of the pin 42 is substantially planar and substantially perpendicular to the stem 46, and is capable of free translation within the bore 30. The head 44 has a diameter that is larger than a corresponding diameter of the stem 46 and the water outlet 40, and remains within the bore 30 between the face 37 and the seat 38. The stem 46 depends from the head 44, and has a diameter smaller than a corresponding diameter of the water outlet 40, so that the stem 46 extends through the water outlet 40, and into the sleeve retention area 50. The stem 46 is capable of free translation through the water outlet 40.

One end of the spring 36 contacts the head 44 of the pin 42, with the other end contacting the face 37 of the base 34. Therefore, the spring 36 is disposed within the bore 30 between the face 37 of the base 34, and the head 44 of the pin 42, and can be compressed between the face 37 and the head 44. In this manner, the spring 36 is capable of applying a force to the pin 35 and the pin 42, as will become more clear herein.

The gasket 48 is circular in shape, and has an inner diameter of sufficient size to accept the stem 46 of the pin 42. The gasket 48 has an outer diameter greater than a corresponding diameter of the water outlet 40. The gasket 48 is constructed of an elastomeric material such as rubber, and the like, and is disposed about the stem 46 of the pin 42 within the bore 30 between the head 44 and the seat 38, so as to form means for restricting water flow or a water tight seal when the gasket 48 contacts the seat 38 under the influence of a force generated by the spring 36 and applied to the head 44 of the pin 42, as detailed herein. The gasket or O-ring 48 is disposed in an annular groove 49 in the stem 46, and is thus abutting the head 44.

The stem 46 of the pin 42 extends beyond the water outlet 40, and into the sleeve retention area 50, where the stem 46 is connected to an enlarged element or body 52. The enlarged body 52 comprises an extension 54 and a knob 56, and is composed of a highly reflective material, such as stainless steel and the like, so that the reflectivity of the enlarged body 52 will attract animals to the watering nipple 20 to drink.

The extension 54 of the enlarged body 52 has a bore 58 therein having a sufficient diameter to accept the stem 46 of the pin 42. The stem 46 can be fixed within the bore 58 in a number of ways, such as by threads, glue, and the like, or by a frictioned interference or press fit. The extension 54 is substantially cylindrical in shape, and has a diameter smaller than a corresponding diameter of the sleeve member 27 so that the extension 54 can reside within the sleeve retention area 50 defined by the sleeve member 27. The extension 54 has a length greater than a corresponding length of the sleeve member 27 and the sleeve retention area 50. In this manner, the extension 54 will extend through the sleeve retention area 50, and protrude beyond the sleeve member 27. The extension 54 is capable of free translation within the sleeve retention area 50.

The knob 56 depends from the extension 54 at a lower end thereof. The knob 56 is disposed below the valve body 22 and spaced from the sleeve member 27. No portion of the knob 56 is disposed within the sleeve retention area 50. The knob 56 has at least two surfaces: an upper, preferably horizontal, surface 60, and a lower rounded surface 62.

The horizontal surface 60 confronts the extension 54, and is substantially circular and planar. The horizontal surface 60 opposes and is spaced a certain distance apart from the sleeve member 27 and the sleeve retention area 50. The horizontal surface 60 has a diameter that is greater than the diameter of the sleeve retention area 50, and preferably about the same as an outside diameter of lower ends of the sleeve member 27. In this manner, the sleeve member 27, the sleeve retention area 50, and the horizontal surface 60 form a water retention area 64 capable of holding a large quantity of water 66, by means of the cohesive forces and natural surface tension of the water 66, in a position from which animals can drink. The benefits of the water retention area 64 will become more clear herein.

The rounded surface 62 of the enlarged body 52 depends from the horizontal surface 60 opposite to the extension 54, and is substantially half-spherical in shape. The rounded surface 62 is smooth, and is substantially free of burrs. This is desirable so that animals will not be injured while drinking from the watering nipple 20. The rounded surface 62 is capable of accepting a force, and applying that force to the pin 42, as will be described herein to release water 66 from the bore 30. The rounded surface 62 also adds to the water retention area 64, thereby allowing more water 66 to be retained by the watering nipple 20.

The operation of the watering nipple 20 will become more clear in the following discussion. When the watering nipples 20 are connected to a water pipe 12, as shown in FIG. 1, water 66 within the water pipe 12 flows through the water inlet 32 in the watering nipple 20. The water 66 flows through a portion of the bore 30 until the water 66 confronts the base 34 at a side thereof opposite to the face 37.

The spring 36 on the opposite side of the base 34 serves at least two purposes in the watering nipple 20. The spring 36 exerts a force on the face 37 of the pin 35, thereby requiring sufficient water pressure to be present in the water pipe 12 to overcome the spring force so that water 66 can enter the bore 30, thereby controlling the rate of water flow through the watering nipple 20. Once water has filled the bore 30, the water pressure in the bore 30 equals the water pressure in the water pipe 12, and the force applied by the spring 36 to the face 37 of the pin 35 causes the base 34 to confront and to engage the fitting 33, thereby closing the water inlet 32, until the water outlet 40 is opened. The spring 36 also exerts an oppositely directed force against the head 44 of the pin 42, thereby compressing the gasket 48 against the seat 38 to form a water-tight seal.

The pressure of the water 66 forces the base 34 downward, against the influence of the force applied by the spring 36, thereby allowing the water 66 to flow past the base 34, and onwards through the bore 30. The water 66 flows about the spring 36 downwards towards the head 44 of the pin 42. Simultaneously, the spring 36 applies a spring force, shown by the arrow 68 in FIG. 3, to the head 44 of the pin 42. The spring force forces the pin 42 downwards towards the water outlet 40, thereby compressing the gasket 48 against the seat 38 of the valve body 22. The gasket 48 forms a water tight seal with the seat 38 so that no water 66 can exit through the water outlet 40. The pressure of the water 66 also adds to the effectiveness of the water tight seal.

The reflectivity of the enlarged body 52, mimicking the appearance of a water droplet, easily catches the attention of a small animal, especially when the animal desires to drink. Referring to FIG. 4, when an animal desires to drink, the animal applies a force, such as that associated with a chicken pecking at the rounded surface 62 of the enlarged body 52, represented by the arrow 70 in FIG. 4, to the enlarged body 52. The enlarged body 52 transmits that force to the stem 46 of the pin 42. The pin 42 moves upwards, or is tilted, under the influence of the force, towards the base 34, thereby compressing the spring 36. The gasket 48, abutting the head 44 of the pin 42, moves away from the seat 38, thereby breaking the water tight seal. Now, water 66 is free to move past the head 44 of the pin 42 and the gasket 48, through the water outlet 40, and into the sleeve retention area 50. The spring 36 may also apply a force to the face 27 of the pin 35, thereby causing the base 34 to confront the fitting 33, throttling or controlling the rate of water flow.

The water 66 moves into the sleeve retention area 50, and encounters the extension 54 of the enlarged body 52. The water 66 flows around the extension 54 and confronts the horizontal surface 60 of the knob 56. The adhesive forces inherent in the water 66, along with the water's natural surface tension, cause the water 66 to be retained within the water retention area 64. Water 66 that does not flow past the extension 54 is retained within the sleeve retention area 50 within the sleeve member 27. Water 66 that flows beyond the horizontal surface 60 is held about the rounded surface 62, by the above disclosed means, to form a droplet 72.

If the animal does not supply a constant force to the knob 56 of the enlarged body 52, as is often the case with poultry who peck at the rounded surface 62 of the knob 56, the spring 36 expands, thereby applying a force, shown by the arrow 68 in FIG. 5, to the head 44 of the pin 42. This force 68 compresses the gasket 48 against the seat 38, reforming the water tight seal and stopping the flow of the water 66.

However, a significant amount of water 66 is retained by the rounded surface 62 in the form of a droplet 72, by the water retention area 64, and by the sleeve retention area 50. The water 66 is retained in an easily accessible location, so that an animal can drink this water 66 freely. When an animal has consumed the volume of the droplet 72, water 66 from the water retention area 64 moves downwards to form another droplet 72. At the same time, water 66 moves from the sleeve retention area 50 downward into the water retention area 64, thereby replenishing the water supply needed to form a droplet 72. In this manner, water 66 is always retained in a position from which animals can easily drink, and the volume of water 66 retained is greater than the volumes retained by any other, currently available watering nipple.

FIG. 6 through 8 show an alternative embodiment of the present invention. The construction and some elements of the alternative embodiment are similar to the above-disclosed embodiment, and similar elements will be designated by like reference numerals having the suffix "A." The watering nipple 20A is similar to the above-described embodiment, except for the differences detailed in the following paragraphs.

Importantly, the reverse check valve pin 35A differs in construction and operation from the pin 35, and the spring 36 has been replaced by a movable element or ball 74A. Specifically, the ball 74A is preferably spherical in shape, contacting the head 44A of the pin 42A along one side, and contacting the contacting portion 37A of the pin 35A along another side. The spherical shape of the ball 74A is desirable because this shape allows the ball 74A to contact the head 44A and the contacting portion 37A generally at about the same point on the head 44A or the contacting portion 37A, regardless of possible tilting of the enlarged body 52A or the pin 42A due to laterally applied pecking forces. The ball 74A rests upon the head 44A of the pin 42A.

The contacting portion 37A of the pin 35A rests upon the ball 74A on a side thereof opposite to the head 44A. The ball 74A and the pin 35A form a weight bearing upon the head 44A of the pin 42A, thereby compressing the gasket 48A against the seat 38A to form a watertight seal. The base 34A of the pin 35A is normally displaced a distance below the fitting 33A. Therefore, the water inlet 32A and the bore 39A through the fitting 33A are usually unobstructed, thereby allowing for free water flow through the watering nipple 20A. There may be occasions when an upwardly directed force is applied to the enlarged body 52A, so that the pin 42A is shifted upwardly into a fully opened condition, as shown in FIG. 7. When this happens, water can be discharged at an excessive rate which can cause spillage of water. However, when the enlarged body 52A is axially shifted upwardly, the ball 74A, and thus the pin 35A, are also shifted so that the base 34A progressively restricts and throttles the water inlet 32A or bore 39A for reducing and controlling the rate at which water can flow therethrough. Thus, the pin 35A comprises means for restricting, and, in extreme cases, for closing the water inlet 32A. The operation of the watering nipple 20A will become more clear in the following paragraphs.

As shown in FIG. 6, the watering nipple 20A is normally in a rest position. Water 66A enters the watering nipple 20A through the water inlet 32A. Because the water inlet 32A and the bore 39A are unobstructed, the water 66A flows freely into the bore 30A in the valve sleeve 22A. The water 66A cannot flow out of the bore 30A because the gasket 48A is compressed against the seat 38A, under the influence of forces, shown by the downwardly directed arrow 76A in FIG. 6 and 8, generated by gravity due to the presence of the ball 74A, the pin 35A, and the enlarged body 52A, as well as the water pressure inside the bore 30A, thereby sealing the bore 30A. Thus, the water 66A is trapped within the bore 30A.

An animal desiring to drink applies a pecking force 70A, shown by the upwardly directed arrow in FIG. 7, to the enlarged body 52A. The pecking frequently merely causes tilting or pivoting of the pin 42A sufficiently to permit water to flow out of the watering nipple 20A in a controlled manner. However, if the pecking force 70A moves the pin 42A upwardly, as shown in FIG. 7, thereby fully opening the water outlet 40A, the water 66A can flow therethrough too rapidly. Under such circumstances, the pin 35A is moved upwardly, as described above, to throttle and even to close the bore 39A. The base 34A thereby controls and/or prohibits flow of water 66A into the bore 30A when the water outlet 40A is wide open.

After the pecking force 70A dissipates, the pin 35A, the ball 74A, and the pin 42A moves downward, closing the water outlet 40A and opening the bore 39A through the fitting 33A. The water 66A is now retained, as discussed above, in the form of a droplet 72A suspended from the rounded surface 62A of the enlarged body 52A. The watering nipple 20A can again be pecked at to release more water 66A.

The watering nipple 20 of the present invention provides many advantages over the watering nipples currently available. The watering nipple 20 has a greater surface area, and, therefore, is able to retain a much larger volume of water 66 in a position easily accessible to animals. With the use of the watering nipple 20, animals can effectively water themselves. The particular construction of the watering nipple 20 is especially adept to employment with poultry or other fowl. Because those animals cannot lick a source of water to drink, they need a watering nipple 20 that can hold a large volume of water 66 in a position at which the fowl can peck in order to drink.

The increased water retention characteristics of the watering nipple 20 reduce water waste and the sanitary problems associated with animal self-watering systems. The means for restricting water flow further enhances this property of the nipple 20. Also, when water 66 is retained as a droplet 72 about the rounded surface 62, and in the water retention area 64, as shown in FIG. 5, the reflectivity of the water 66 enhances the reflectivity of the enlarged body 52, presenting the animals with an image that can encourage them to drink.

The watering nipple 20A presents numerous advantages in addition to those present in the watering nipple 20. Because the bore 39A through the fitting 33A is throttled or closed when the water outlet 40A is opened, the watering nipple 20A can only discharge at a certain metered rate. This allows for uniform discharge of water 66A from a plurality of watering nipples 20A spaced along a water supply pipe 12A. The water flow rate can be specifically controlled, and the amount of water 66A discharged can be specifically metered. The presence of the ball 74A assures that the water flow rate into all watering nipples 20A disposed on a water pipe 12A will be uniform.

While preferred embodiments of the present invention have been shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A watering nipple for watering animals comprising: a body connectable with a source of water and having an inlet and an outlet; a valve element operatively located in the body shiftable between outlet closing and outlet opening positions; the valve element including a depending stem; a sleeve member depending from the body around the outlet and the stem; the stem depending below a lower terminal end of the sleeve member; an enlarged element connected with the stem for presenting an upwardly facing surface below the lower terminal end of the sleeve member and defining therewith a water retention area; means for closing the inlet; and a movable element operatively located between the closing means and the valve element for actuating the closing means responsive to shifting of the valve element.

2. A watering nipple as defined in claim 1 wherein the means for closing the inlet comprises a pin having a base.

3. A watering nipple as defined in claim 1 wherein the movable element includes spring means for resiliently biasing the valve element towards the outlet closing position.

4. A watering nipple as defined in claim 1 wherein the body includes a conical valve seat defining the outlet; the stem having an upper end; and the valve element including an enlarged head connected with the upper end and overlying the valve seat.

5. A watering nipple as defined in claim 4 wherein the valve element includes a gasket disposed beneath the head for sealing engagement with the valve seat.

6. A watering nipple as defined in claim 5 wherein the movable element includes one of a spring and a movable element disposed within the body and engagable with the head for biasing the valve element towards the outlet closing position.

7. A watering nipple as defined in claim 6 wherein the gasket is elastomeric.

8. A watering nipple as defined in claim 6 wherein the gasket is rubber.

9. A watering nipple for watering animals comprising: a body having an inlet and an outlet; means for restricting water flow disposed through the body for opening and closing the outlet; a sleeve retention area for retaining water for animals to drink located within the body below the outlet; an enlarged body connected to the restricting means within the sleeve retention area; the enlarged body having a surface spaced below and opposing the body and the sleeve retention area; a water retention area formed by the surface and the body; the sleeve retention area, the water retention area, and the surface retaining water for an animal to drink; whereby upon application of a force to the enlarged body, the force is transferred to the means for restricting water flow to open the outlet, and thereby allowing water to flow through the outlet.

10. A watering nipple as defined in claim 9 further comprising a movable element for gravitationally biasing the valve element to close the outlet.

11. A watering nipple as defined in claim 10 wherein the movable element has a spherical configuration.

12. A watering nipple as defined in claim 9 wherein the enlarged body has a rounded portion depending therefrom for supporting a droplet of water.

13. A watering nipple as defined in claim 9 wherein the enlarged body is reflective.

14. A watering nipple as defined in claim 9 wherein the enlarged body is stainless steel.

* * * * *

REEXAMINATION CERTIFICATE (2879th)
United States Patent [19]
Siddiqui et al.

[11] B1 5,154,138
[45] Certificate Issued May 14, 1996

[54] WATERING NIPPLE

[75] Inventors: Shahid A. Siddiqui, Leesburg; Timothy W. Momont, Wolcottville, both of Ind.

[73] Assignee: CTB, Inc., North-Milford, Ind.

Reexamination Request:
No. 90/003,905, Jul. 6, 1995

Reexamination Certificate for:
Patent No.: 5,154,138
Issued: Oct. 13, 1992
Appl. No.: 740,317
Filed: Aug. 5, 1991

[51] Int. Cl.⁶ .................. A01K 39/02; F16L 1/16
[52] U.S. Cl. .................. 119/72.5; 251/339
[58] Field of Search ........... 119/72, 72.5; 151/125, 151/303, 339; 137/604, 614.19; 222/422

[56] References Cited

U.S. PATENT DOCUMENTS 4,402,343  9/1983  Thompson et al. ............ 119/72.5
5,193,485  3/1993  Hostetler ....................... 119/72.5

FOREIGN PATENT DOCUMENTS 3802918  7/1991  Germany.

Primary Examiner—Todd E. Manahan

[57] ABSTRACT

The watering nipple, constructed according to the teachings of the present invention, comprises a body having a water delivering channel therein. The water delivering channel has an inlet and an outlet, and defines a path of water flow. A pin having a head and a stem is disposed within the water delivering channel, with the stem protruding beyond the outlet. The pin is capable of movement within the water delivering channel so as to open and close the outlet. An enlarged body, having an extension and a knob, is connected to the stem. The knob has a horizontal surface which confronts the valve body thereby increasing the surface area capable of retaining water. A pin and a movable element are included within the water delivering channel in some constructions. The pin is able to close the inlet under the influence of the movable element.

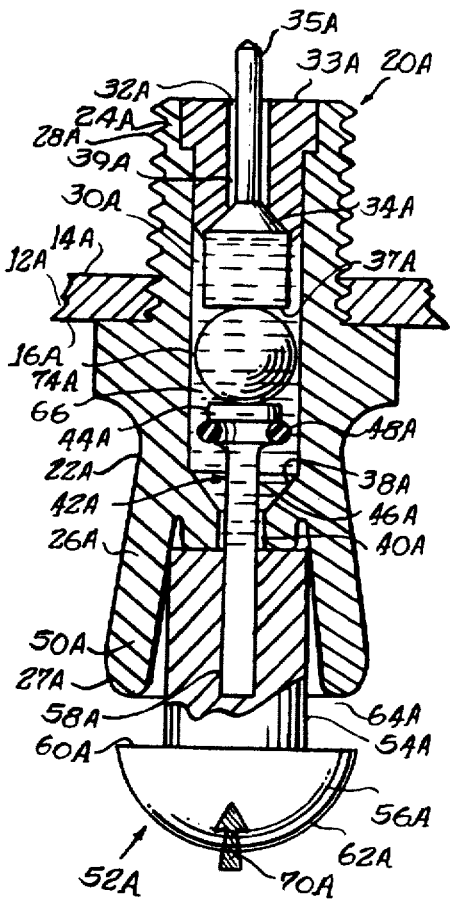

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–14 is confirmed.

* * * * *